United States Patent
Kaji

(10) Patent No.: US 11,370,029 B2
(45) Date of Patent: Jun. 28, 2022

(54) METHOD OF ADDITIVE MANUFACTURING A THREE-DIMENSIONAL OBJECT

(71) Applicant: SODICK CO., LTD., Kanagawa (JP)

(72) Inventor: Toshio Kaji, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 349 days.

(21) Appl. No.: 16/503,640

(22) Filed: Jul. 5, 2019

(65) Prior Publication Data
US 2020/0023434 A1    Jan. 23, 2020

(30) Foreign Application Priority Data

Jul. 20, 2018  (JP) .............................. JP2018-136613

(51) Int. Cl.
| | | |
|---|---|---|
| B22F 10/20 | (2021.01) | |
| B33Y 10/00 | (2015.01) | |
| B33Y 50/02 | (2015.01) | |
| B22F 10/30 | (2021.01) | |
| B33Y 30/00 | (2015.01) | |

(52) U.S. Cl.
CPC .............. *B22F 10/20* (2021.01); *B33Y 10/00* (2014.12); *B33Y 50/02* (2014.12); *B22F 10/30* (2021.01); *B33Y 30/00* (2014.12)

(58) Field of Classification Search
CPC .......... B22F 10/20; B22F 10/31; B22F 10/85; B29C 64/153; B29C 64/393; B33Y 10/00; B33Y 50/02
See application file for complete search history.

(56) References Cited

U.S. PATENT DOCUMENTS

| | | | |
|---|---|---|---|
| 5,017,753 A | 5/1991 | Deckard | |
| 7,754,135 B2 | 7/2010 | Abe et al. | |
| 2015/0061170 A1* | 3/2015 | Engel | B33Y 10/00 |
| | | | 264/40.1 |
| 2017/0292922 A1 | 10/2017 | Woods et al. | |
| 2017/0355136 A1* | 12/2017 | Matsumoto | B29C 64/214 |

FOREIGN PATENT DOCUMENTS

| | | |
|---|---|---|
| JP | H01502890 | 10/1989 |
| JP | 3599059 | 12/2004 |
| JP | 2017194459 | 10/2017 |
| JP | 2019157177 | 9/2019 |

* cited by examiner

*Primary Examiner* — Michael P Wieczorek
(74) *Attorney, Agent, or Firm* — JCIPRNET

(57) ABSTRACT

The disclosure provides a method of additive manufacturing a three-dimensional object, which can prevent a blade from being caught by a deformed part that is generated due to an unpredictable change of a sintering condition. In the method of additive manufacturing the three-dimensional object, if a deformed part having any height is generated on the upper surface of the $n^{th}$ sintered layer, when the next $n+1^{th}$ sintered layer is formed, the $n+1^{th}$ powder layer is irradiated with laser by avoiding the region where the deformed part is generated. Then, after the $n+2^{th}$ powder layer is formed, the unsintered part is sintered together with the $n+2^{th}$ powder layer.

2 Claims, 11 Drawing Sheets

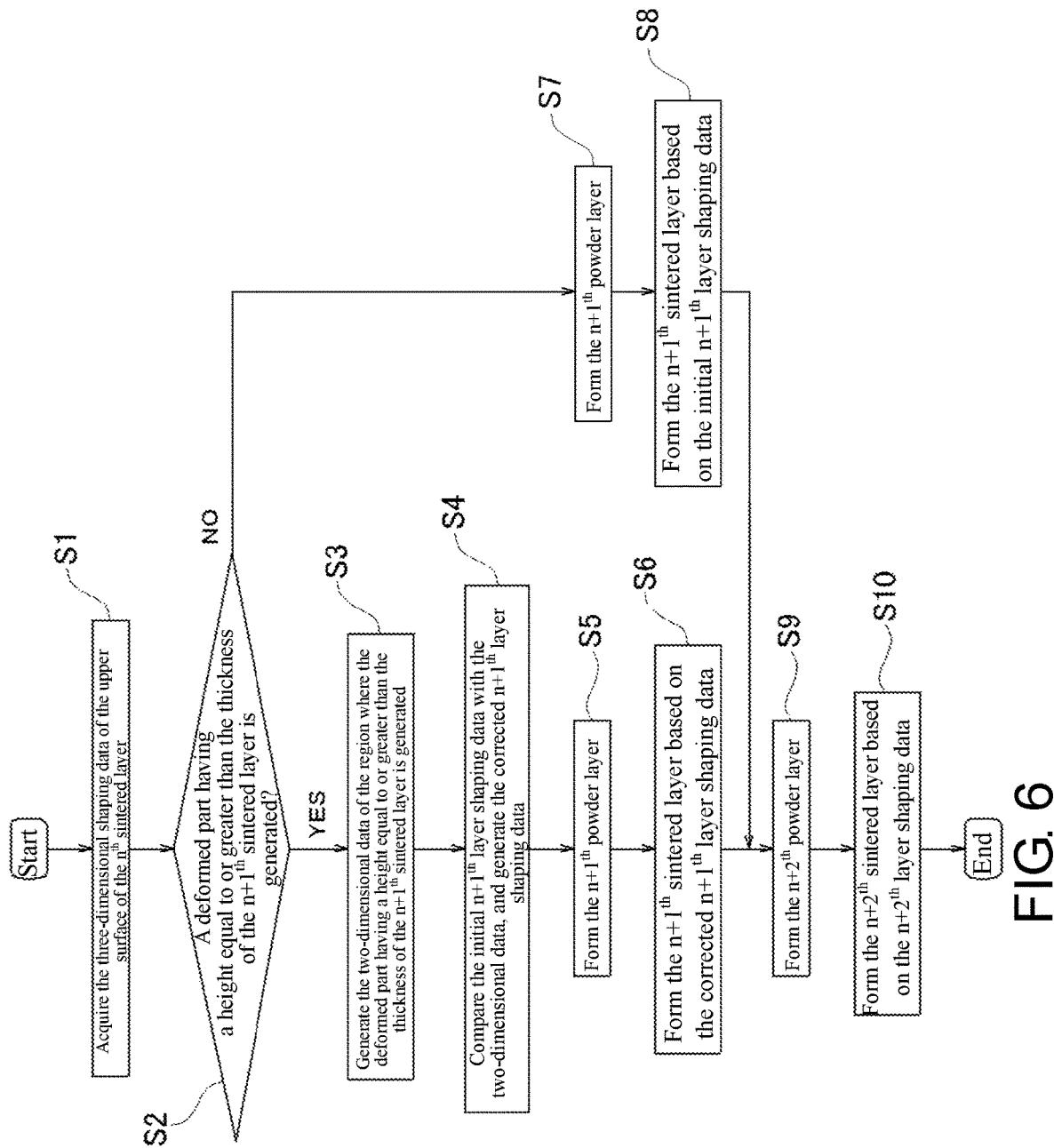

METHOD OF ADDITIVE MANUFACTURING A THREE-DIMENSIONAL OBJECT

CROSS-REFERENCE TO RELATED APPLICATION

This application claims the priority benefit of Japan application serial no. 2018-136613, filed on Jul. 20, 2018. The entirety of the above-mentioned patent application is hereby incorporated by reference herein and made a part of this specification.

BACKGROUND

Technical Field

The disclosure relates to a method of additive manufacturing a three-dimensional object of metal by laser sintering.

Description of Related Art

Patent Document 1 describes an additive manufacturing apparatus as an apparatus for producing a three-dimensional object of metal. In the additive manufacturing apparatus, in the shaping space inside the shaping chamber, a recoater head is moved in a horizontal axial direction, and material powder of metal is supplied and flattened by a material storage box and a blade provided on the recoater head to form a powder layer, and a laser irradiation device is used to irradiate a predetermined range of the powder layer with laser to form a sintered layer. Then, the processes of forming a new powder layer on the sintered layer and irradiating it with laser to form a sintered layer are repeated, thereby producing a three-dimensional object of metal.

Here, in the additive manufacturing apparatus as described in Patent Document 1, due to a setting error of the laser irradiation condition, sparks may scatter when the powder layer is irradiated with laser to form a sintered layer, and residues of the material powder contained in the sparks may attach to the surface of the sintered layer and generate a protruding abnormal sintered part. Then, if the height of the generated abnormal sintered part is greater than the thickness of the powder layer formed on the sintered layer, the abnormal sintered part may protrude from the upper surface of the powder layer, and the abnormal sintered part may collide with the blade for flattening the powder layer and cause damage to the blade.

In order to solve such a problem, Patent Document 2 describes an additive manufacturing apparatus as an apparatus that can cut off the abnormal sintered part with a cutting tool to produce a three-dimensional object without interrupting the shaping processing. In the additive manufacturing apparatus, whether an abnormal sintered part is generated on the surface of the sintered layer is detected every time the sintered layer is formed, and if there is an abnormal sintered part, the abnormal sintered part on the path of the blade at the time of powder layer formation is cut off.

Also, by performing shaping under an appropriate laser irradiation condition, it is possible to prevent generation of an abnormal sintered part, which is the cause of the above-mentioned problem, even without the cutting as in Patent Document 2.

However, even if the shaping is performed under an appropriate laser irradiation condition, a deformation, such as obvious swelling of a partial region of the sintered layer, may still occur. More specifically, for example, unpredictable changes of the sintering condition, such as smoke, which is called fume, generated when the material powder is sintered, contamination of the lens through which the laser passes, and deviation of the focal position of the laser caused by focus shift, may reduce the irradiation energy of the laser and cause a part of the material powder that forms the sintered layer to become unsintered, and the region sintered with low irradiation energy may swell to protrude with respect to its surrounding region.

When such a deformation occurs, if formation of the subsequent sintered layers continues without dealing with the deformed part, there may be various problems, and often the deformation may become large and catch the blade.

Here, the thickness of one powder layer is set to about 80 µm so that the thickness of the sintered layer after the sintering will be about 50 µm. The particle diameter of the material powder is about 10 µm to 50 µm, from which it is known that each powder layer is very thin.

Therefore, even if the height of the deformed part is smaller than the thickness of the powder layer formed on the sintered layer and the tip portion thereof does not pop out of the upper surface of the powder layer, when the powder layer is flattened, the blade may still be caught by the deformed part which has reached a predetermined height or more.

RELATED ART

Patent Document

[Patent Document 1] Japanese Translation of PCT International Application Publication No. JP-T-H1-502890
[Patent Document 2] Japanese Patent No. 3599059

SUMMARY

A method of additive manufacturing a three-dimensional object according to the first embodiment of the disclosure is for irradiating with laser a predetermined region of each powder layer, which is composed of material powder of metal formed on a shaping table, based on shaping data of the three-dimensional object, which is a production target, to laminate and form a sintered layer. The method of additive manufacturing the three-dimensional object includes: a three-dimensional shaping data acquisition process of acquiring three-dimensional shaping data of an upper surface of an $n^{th}$ sintered layer positioned uppermost; a deformed part detection process of detecting whether a deformed part of any height, which protrudes with respect to the upper surface of the $n^{th}$ sintered layer, is generated based on the three-dimensional shaping data; a two-dimensional data generation process of generating two-dimensional data including coordinate data of a region where the deformed part is generated when the deformed part is generated; a corrected $n+1^{th}$ layer shaping data generation process of matching and comparing coordinates of initial $n+1^{th}$ layer shaping data and the two-dimensional data, and generating corrected $n+1^{th}$ layer shaping data that excludes the region where the deformed part is generated, which is defined in the two-dimensional data, from a laser irradiated region defined in the initial $n+1^{th}$ layer shaping data; an $n+1^{th}$ powder layer formation process of forming an $n+1^{th}$ powder layer on the $n^{th}$ sintered layer; a formation process for an $n+1^{th}$ sintered layer excluding the region where the deformed part is generated, in which the $n+1^{th}$ sintered layer is formed by irradiating with laser and sintering the $n+1^{th}$ powder layer based on the corrected $n+1^{th}$ layer shaping data; an $n+2^{th}$ powder layer formation process of forming an n+2$^{th}$ powder layer on the n+1$^{th}$ sintered layer; and a formation process for the n+1$^{th}$ sintered layer in the region where the deformed part is generated and an n+2$^{th}$ sintered layer, in which the n+1$^{th}$ sintered layer in the region where the deformed part is generated and the n+2$^{th}$ sintered layer are formed by irradiating with laser and sintering the region where the deformed part is generated in the n+1$^{th}$ powder layer and the n+2$^{th}$ powder layer based on n+2$^{th}$ shaping data.

BRIEF DESCRIPTION OF THE DRAWINGS

FIG. 6 is a flow chart showing the flow from formation of the n$^{th}$ sintered layer to formation of the n+1$^{th}$ sintered layer.

DESCRIPTION OF THE EMBODIMENTS

Figure 1:
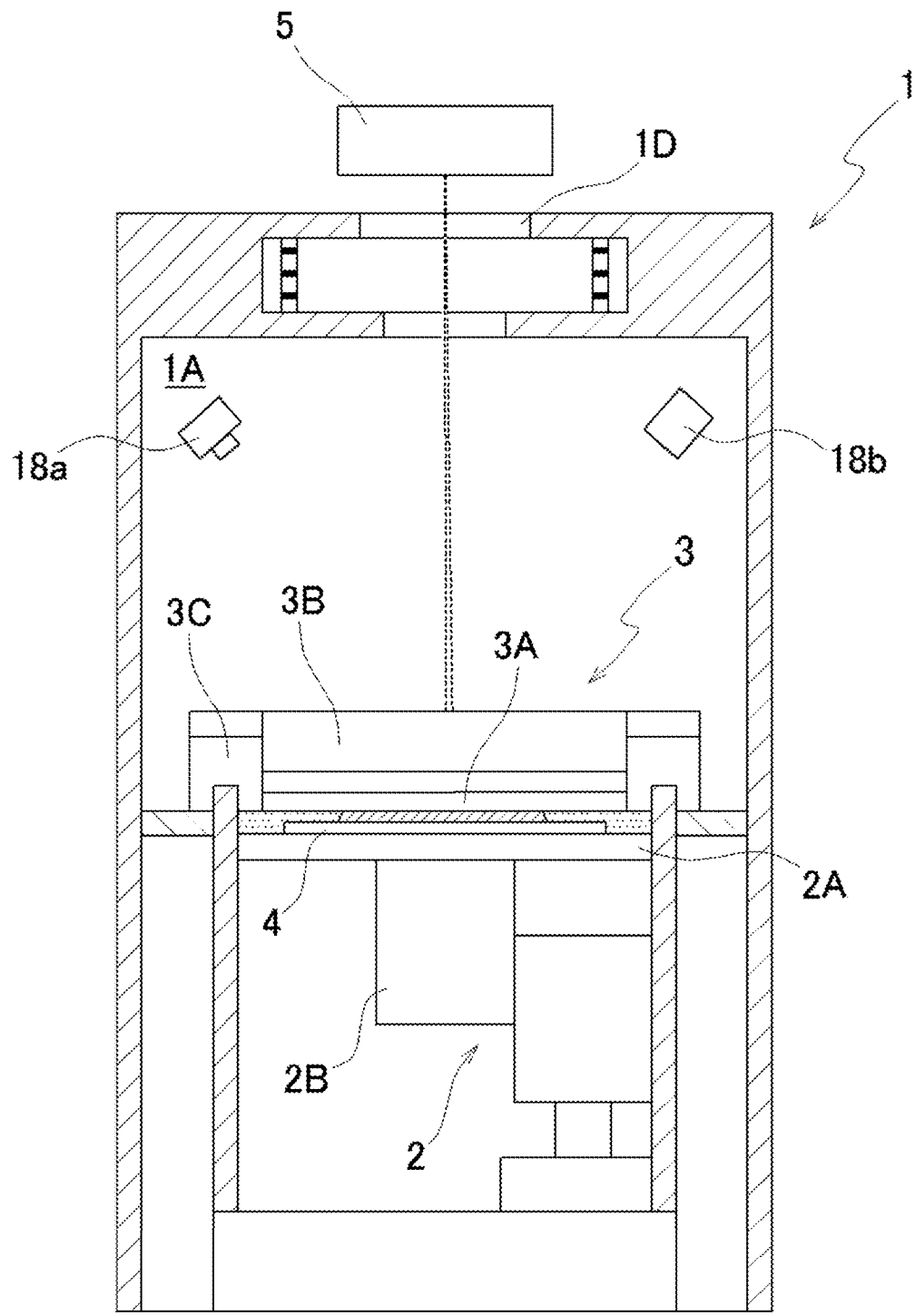
FIG. 1 is a side view of the additive manufacturing apparatus.

The disclosure provides a method of additive manufacturing a three-dimensional object, which can prevent the blade from being caught by a deformed part that is generated due to an unpredictable change of the sintering condition.

A method of additive manufacturing a three-dimensional object according to the first embodiment of the disclosure is for irradiating with laser a predetermined region of each powder layer, which is composed of material powder of metal formed on a shaping table, based on shaping data of the three-dimensional object, which is a production target, to laminate and form a sintered layer. The method of additive manufacturing the three-dimensional object includes: a three-dimensional shaping data acquisition process of acquiring three-dimensional shaping data of an upper surface of an n$^{th}$ sintered layer positioned uppermost; a deformed part detection process of detecting whether a deformed part of any height, which protrudes with respect to the upper surface of the n$^{th}$ sintered layer, is generated based on the three-dimensional shaping data; a two-dimensional data generation process of generating two-dimensional data including coordinate data of a region where the deformed part is generated when the deformed part is generated; a corrected n+1$^{th}$ layer shaping data generation process of matching and comparing coordinates of initial n+1$^{th}$ layer shaping data and the two-dimensional data, and generating corrected n+1$^{th}$ layer shaping data that excludes the region where the deformed part is generated, which is defined in the two-dimensional data, from a laser irradiated region defined in the initial n+1$^{th}$ layer shaping data; an n+1$^{th}$ powder layer formation process of forming an n+1$^{th}$ powder layer on the n$^{th}$ sintered layer; a formation process for an n+1$^{th}$ sintered layer excluding the region where the deformed part is generated, in which the n+1$^{th}$ sintered layer is formed by irradiating with laser and sintering the n+1$^{th}$ powder layer based on the corrected n+1$^{th}$ layer shaping data; an n+2$^{th}$ powder layer formation process of forming an n+2$^{th}$ powder layer on the n+1$^{th}$ sintered layer; and a formation process for the n+1$^{th}$ sintered layer in the region where the deformed part is generated and an n+2$^{th}$ sintered layer, in which the n+1$^{th}$ sintered layer in the region where the deformed part is generated and the n+2$^{th}$ sintered layer are formed by irradiating with laser and sintering the region where the deformed part is generated in the n+1$^{th}$ powder layer and the n+2$^{th}$ powder layer based on n+2$^{th}$ shaping data.

In the disclosure, if a deformed part having any height is generated on the upper surface of the n$^{th}$ sintered layer, when the next n+1$^{th}$ sintered layer is formed, the n+1$^{th}$ powder layer is irradiated with laser by avoiding the region where the deformed part is generated. Then, after the n+2$^{th}$ powder layer is formed, the unsintered part is sintered together with the n+2$^{th}$ powder layer. Thus, it is possible to prevent the above-described deformation from being continuously generated at a specific location, and to reset the three-dimensional object that is being shaped to the state before the deformed part is generated. Therefore, it is possible to prevent the blade from being caught during formation of the powder layer.

The method of additive manufacturing the three-dimensional object according to the second embodiment of the disclosure is characterized in that, based on the first embodiment of the disclosure, in the n+1$^{th}$ powder layer formation process, the n+1$^{th}$ powder layer is formed on the n$^{th}$ sintered layer by supplying the material powder with a recoater head that stores the material powder, and flattening the material powder with a brush-like brush blade attached to the recoater head.

In the disclosure, in the n+1$^{th}$ powder layer formation process, the n+1$^{th}$ powder layer is formed on the n$^{th}$ sintered layer by supplying the material powder with the recoater head that stores the material powder, and flattening the material powder with the brush-like brush blade attached to the recoater head. Thus, even if an abnormal sintered part or deformed part that has a height greater than the thickness of the n+1$^{th}$ powder layer is generated on the upper surface of the n$^{th}$ sintered layer, it is still possible to prevent the blade from being caught.

According to the disclosure, it is possible to prevent the blade from being caught by a deformed part that is generated due to an unpredictable change of the sintering condition.

Hereinafter, embodiments of the disclosure will be described with reference to the drawings.

Figure 2:
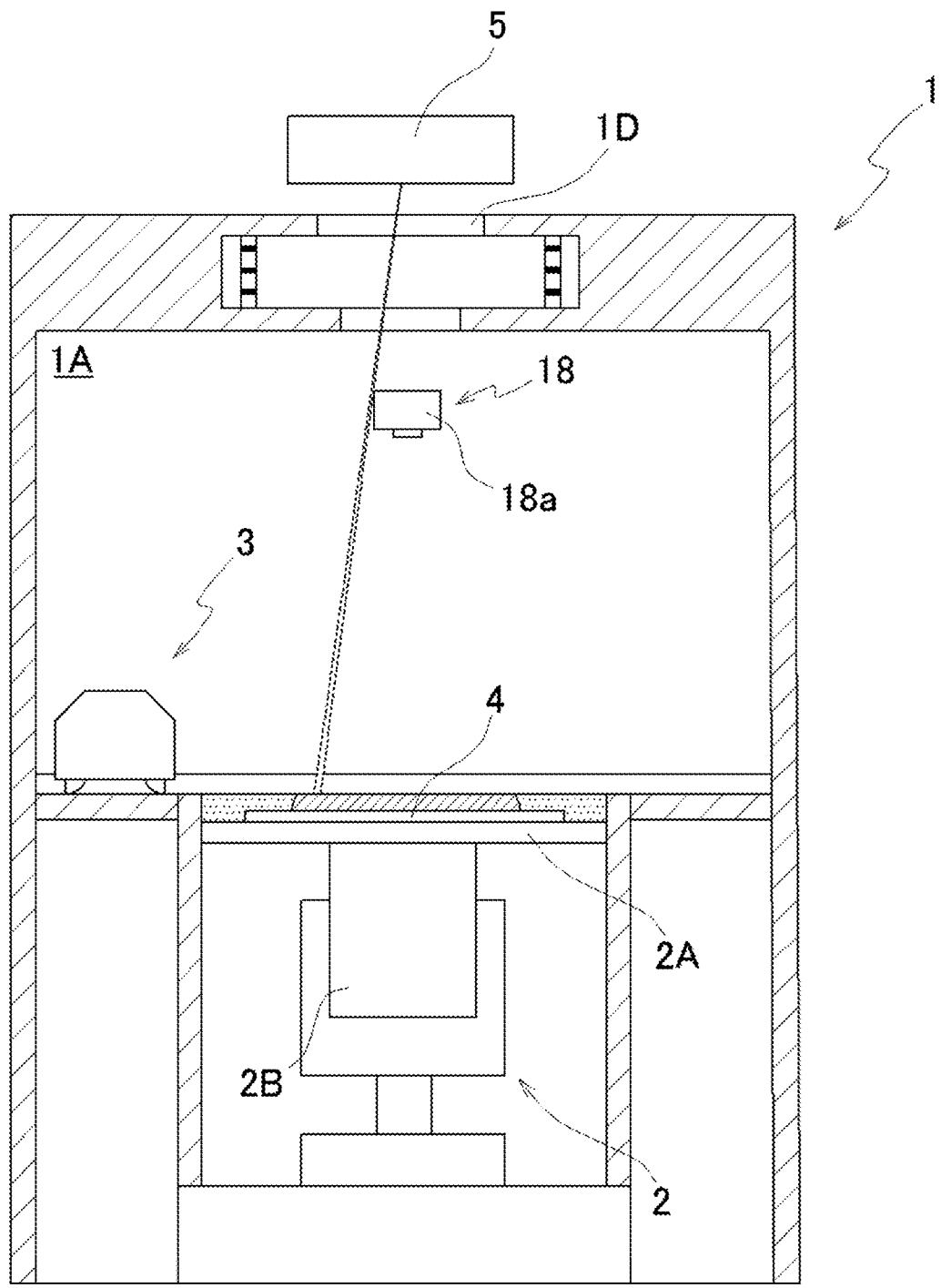
FIG. 2 is a front view of the additive manufacturing apparatus.

An additive manufacturing apparatus 1 is an additive manufacturing apparatus which sinters material powder. As shown in FIG. 1 and FIG. 2, in the shaping chamber of the additive manufacturing apparatus 1, a shaping chamber 1A is provided. An inert gas is supplied to the shaping chamber 1A from an inert gas supply device (not shown). Thus, it is configured that the oxygen concentration in the shaping chamber 1A is as low as possible. Further, a shaping table 2A is accommodated in the shaping chamber 1A. A shaping space where material powder of metal is spread is formed on the upper side of the shaping table 2A. A shaping plate 4 for laminating and shaping a three-dimensional object on the upper side thereof is disposed on the shaping table 2A.

As shown in FIG. 1 and FIG. 2, a powder layer forming device 2 includes the shaping table 2A, a support mechanism 2B that supports and raises or lowers the shaping table 2A, a transmission mechanism 2C that transmits an operation to the support mechanism 2B, a drive device (not shown) that includes a support mechanism drive motor for driving the support mechanism 2B, etc. Every time a powder layer is formed, the shaping table 2A is lowered by a distance corresponding to the thickness of the powder layer that is to be formed next.

Figure 3:
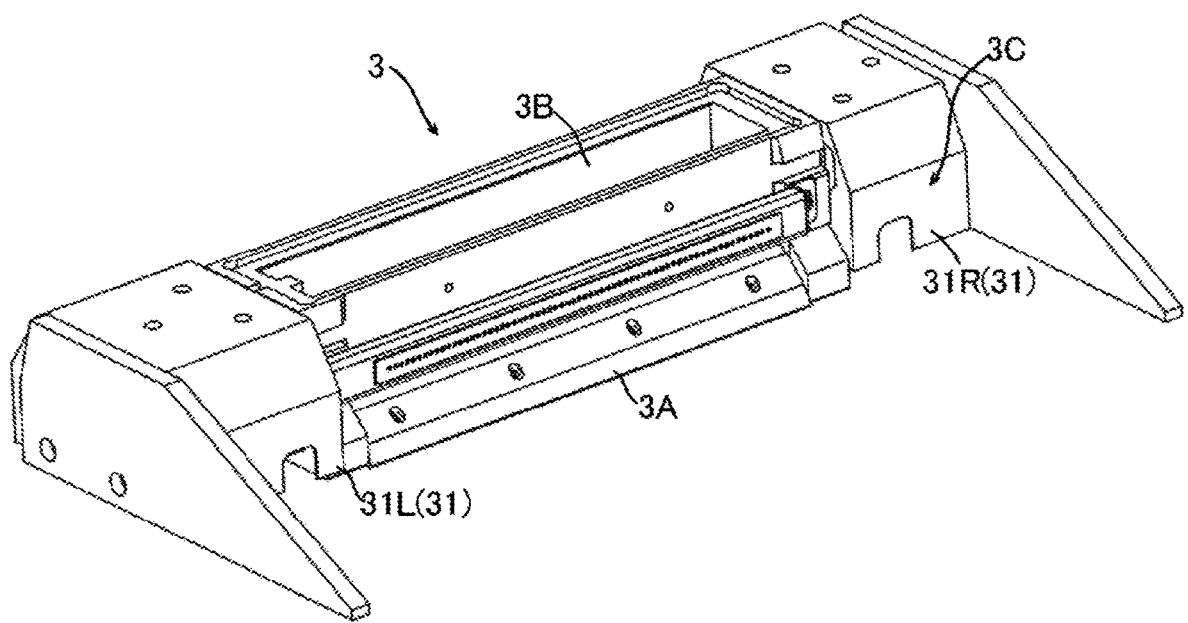
FIG. 3 is a perspective view of the recoater head.
Figure 4:
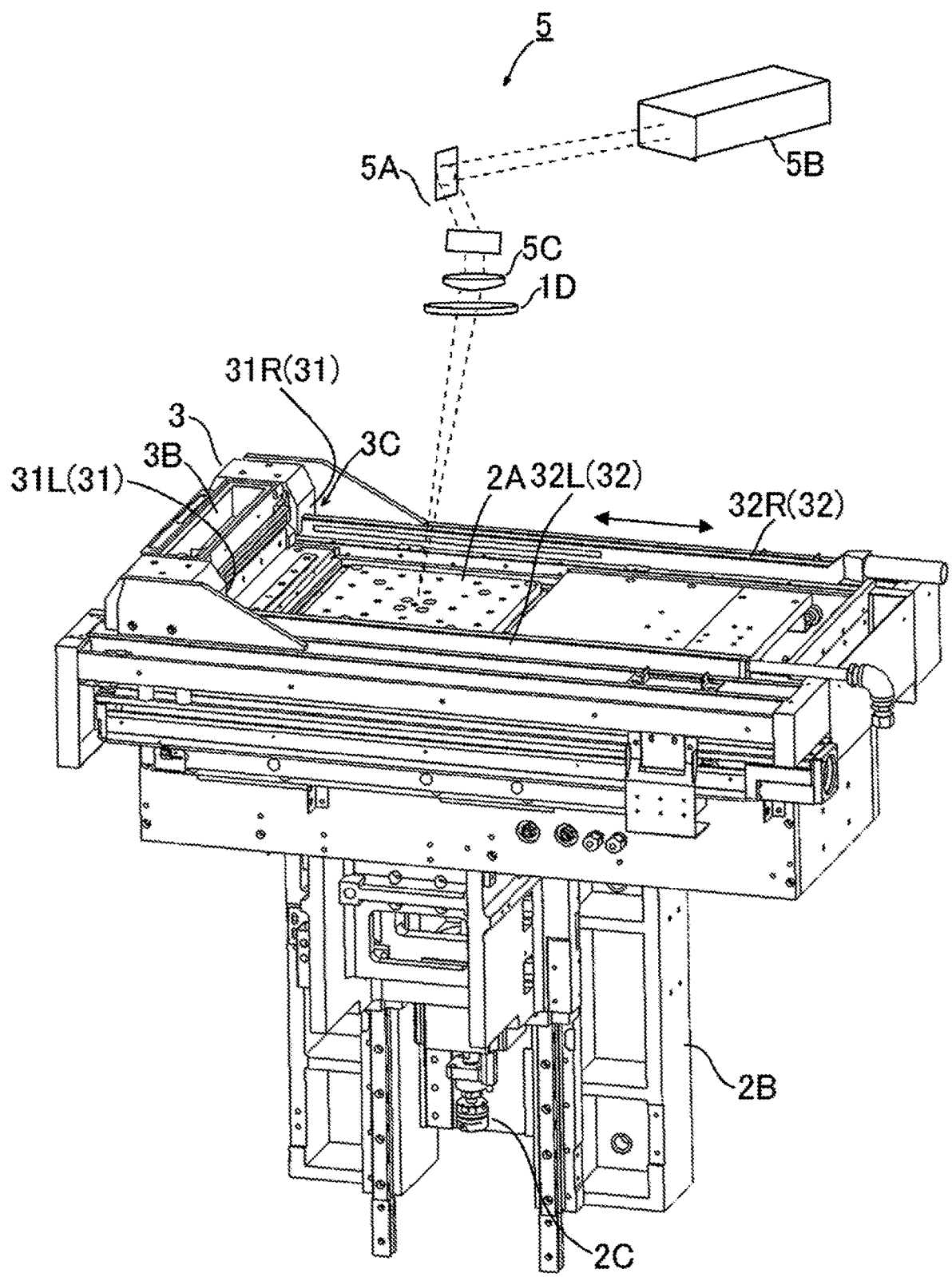
FIG. 4 is a perspective view of the powder layer forming device and the laser irradiation device.

As shown in FIG. 3 and FIG. 4, a recoater head 3 includes a blade 3A, a material storage box 3B, and a guide mechanism 3C. The guide mechanism 3C has a pair of bearings 31, and guide rails 32R and 32L which are a pair of shaft members 32 received by the bearings 31R and 31L respectively. The recoater head 3 moves in the left-right direction on the shaping table 2A along the guide rails 32R and 32L of the guide mechanism 3C based on a scan command of a blade servo motor control device 19 which will be described later. Thereby, material powder is supplied onto the shaping table 2A from the material storage box 3B and flattened by the blade 3A so as to form a powder layer on the shaping plate 4.

A material supply device (not shown) for supplying material powder to the material storage box 3B is provided above a standby position where the recoater head 3 stands by after formation of a powder layer. The material supply device supplies material powder to the material storage box 3B as required so as to prevent the material powder in the material storage box 3B from running out during shaping of the three-dimensional object.

A laser irradiation device 5 forms a sintered layer in a part or the entire region of the powder layer on the shaping plate 4. The laser irradiation device 5 includes a laser scanning device 5A including two galvano mirrors, a laser oscillator 5B, a focus lens 5C, a laser control device 20 for controlling these, etc.

The laser with predetermined energy outputted from the laser oscillator 5B reaches the galvano mirrors of the laser scanning device 5A through a laser transmission member. The laser reflected by the pair of galvano mirrors is converged by the focus lens 5C and passes through a transmission lens 1D provided in a through hole that is formed through the top plate of the shaping chamber 1A. The laser converged by the focus lens 5C is emitted with a predetermined spot diameter. In addition, the origin of the laser irradiation position is an irradiation position at the time when the laser is emitted in the vertical direction from the laser oscillator 5B to be orthogonal to the powder layer, and substantially coincides with the center position of the shaping plate 4 where the powder layer is formed.

The laser scanning device 5A of the laser irradiation device 5 is disposed on the top plate of the shaping chamber 1A. Each galvano mirror of the laser scanning device 5A is provided with an electric actuator (not shown) for rotating the galvano mirror. The electric actuator is driven in accordance with the scan command of the laser control device 20. The laser scanning device 5A moves the spot of the laser sequentially from one end side to the other end side of each irradiated region along a predetermined scanning path at a predetermined moving speed by the laser control device 20.

Figure 5:
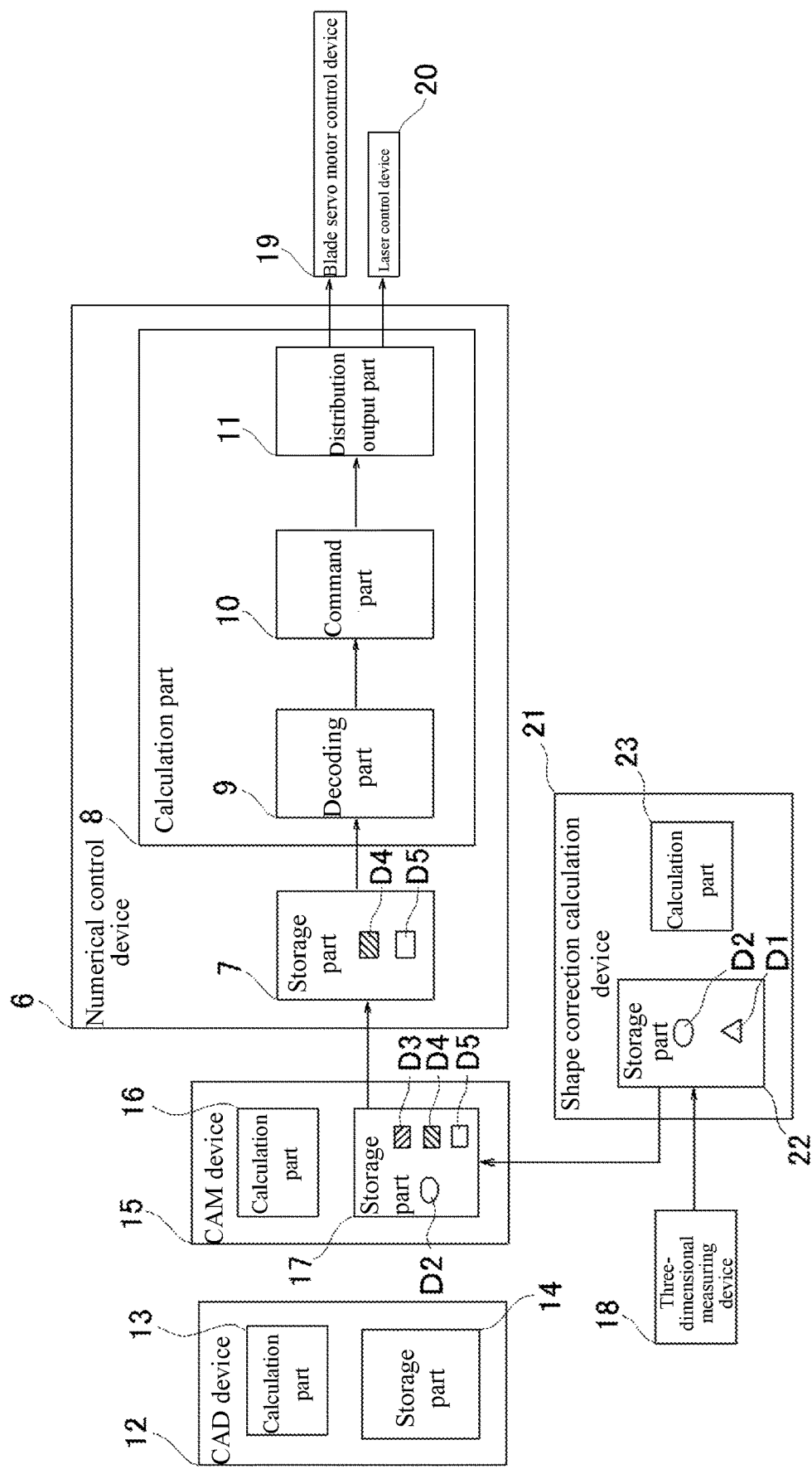
FIG. 5 is a block diagram showing control of each device that constitutes the additive manufacturing apparatus.

As shown in FIG. 5, a CAD device 12 is for generating solid data of a three-dimensional object to be shaped by the additive manufacturing apparatus 1. The CAD device 12 includes a calculation part 13 for generating solid data of a three-dimensional object, a storage part 14 for storing the solid data generated by the calculation part 13, etc. The solid data is three-dimensional data indicating the shape and dimensions of a predetermined three-dimensional object.

A CAM device 15 is for generating shaping data from the solid data generated by the CAD device 12. The CAM device 15 includes a calculation part 16 for generating shaping data from the solid data generated by the CAD device 12, a storage part 17 for storing the solid data generated by the CAD device 12 and the shaping data generated by the calculation part 16, etc. In addition, the shaping data indicates the operation procedure of each device that constitutes the additive manufacturing apparatus during shaping of the predetermined three-dimensional object. The shaping data includes, for example, coordinate data of the irradiated region of the laser. The coordinate data of the irradiated region of the laser is used for defining the irradiated region of the laser emitted from the laser irradiation device 5 toward the powder layer for each layer.

A numerical control device 6 includes a storage part 7, a calculation part 8, etc. The storage part 7 stores the shaping data, etc. of the three-dimensional object generated by the CAM device 15. The calculation part 8 includes a decoding part 9 for decoding the shaping data, etc. stored in the storage part 7, a command part 10 for outputting a command based on the shaping data decoded by the decoding part 9, a distribution output part 11 for distributing and outputting the command from the command part 10 to each device mentioned above, etc.

A movement command from the command part 10 of the calculation part 8 is inputted as a signal or data to a blade servo motor control device 19. A blade servo motor (not shown) reciprocates the blade 3A in the horizontal direction on the shaping table 2A based on the command transmitted from the blade servo motor control device 19.

The laser control device 20 includes an actuator control device, a drive current supply device, etc. (not shown). The laser control device 20 outputs a scan command as a signal or data to the actuator control device based on the shaping data. Each electric actuator of the laser irradiation device 5 receives supply of a drive current according to the scan command from the drive current supply device, and tilts the galvano mirror in a desired direction.

Further, in the present embodiment, if a deformed part having a height equal to or greater than the thickness of the $n+1^{th}$ sintered layer is generated on the upper surface of the $n^{th}$ sintered layer, the laser is emitted avoiding the region where the deformed part is generated when the next $n+1^{th}$ sintered layer is formed. Then, the unsintered part is sintered together with the $n+2^{th}$ powder layer. The control and operation of each device from formation of the $n^{th}$ sintered layer to formation of the $n+2^{th}$ sintered layer will be described in detail below following the block diagram of FIG. 5 and the flow chart of FIG. 6 with reference to FIG. 7(a) and FIG. 7(b) to FIG. 10(a) and FIG. 10(b).

First, a three-dimensional measuring device 18 acquires three-dimensional shaping data D1 of the upper surface of the $n^{th}$ sintered layer, which is the uppermost layer of the three-dimensional object that is being shaped (step S1). As shown in FIG. 1 and FIG. 2, the three-dimensional measuring device 18 includes a camera 18a and a projector 18b, for example. The camera 18a and the projector 18b are disposed at the top in the shaping chamber 1A. The camera 18a and the projector 18b acquire the three-dimensional shaping data D1 of the upper surface of the $n^{th}$ sintered layer by using a grid projection method. The three-dimensional shaping data D1 includes the coordinate data of the region where the deformed part that protrudes with respect to the upper surface of the $n^{th}$ sintered layer is generated, the data of the height of the deformed part, etc. The three-dimensional shaping data D1 is stored in a storage part 22 of a shape correction calculation device 21.

Figure 7A:
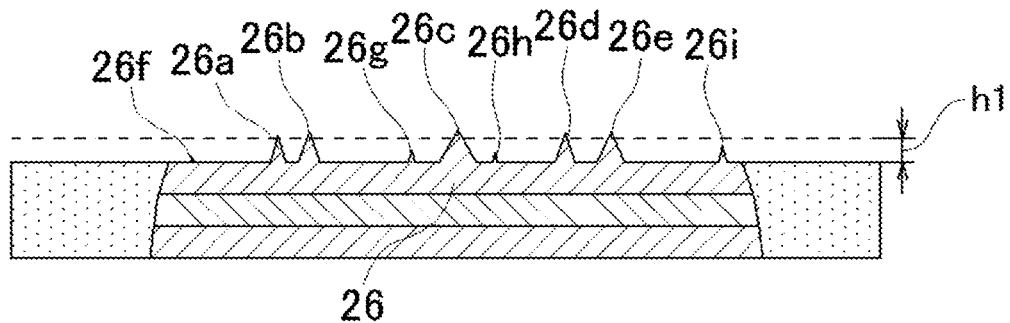
FIG. 7(a) is an internal side view of the three-dimensional object after formation of the n$^{th}$ sintered layer.

Next, a calculation part 23 of the shape correction calculation device 21 analyzes the three-dimensional shaping data D1 and detects whether a deformed part is present (step S2). More specifically, as shown in FIG. 7(a), for example, if the calculation part 23 of the shape correction calculation device 21 analyzes the heights of the deformed parts 26a to 26i generated on the upper surface of the $n^{th}$ sintered layer 26 and detects that the deformed parts 26a to 26e have heights equal to or greater than the thickness h1 of the $n+1^{th}$ sintered layer 28 that is to be formed on the $n^{th}$ sintered layer 26, it determines that "deformed parts are generated on the $n^{th}$ sintered layer". In addition, if the heights of all the deformed parts generated on the upper surface of the $n^{th}$ sintered layer are smaller than the thickness of the $n+1^{th}$ sintered layer, the calculation part 23 of the shape correction calculation device 21 determines that "no deformed part is generated on the $n^{th}$ sintered layer". The data of the thickness of the powder layer and the thickness of the sintered layer obtained by sintering the powder layer is stored in the storage part 22 of the shape correction calculation device 21. For example, if the powder layer has a thickness of about 80 µm, the thickness of the sintered layer obtained by sintering the powder layer is about 50 µm.

Figure 7B:
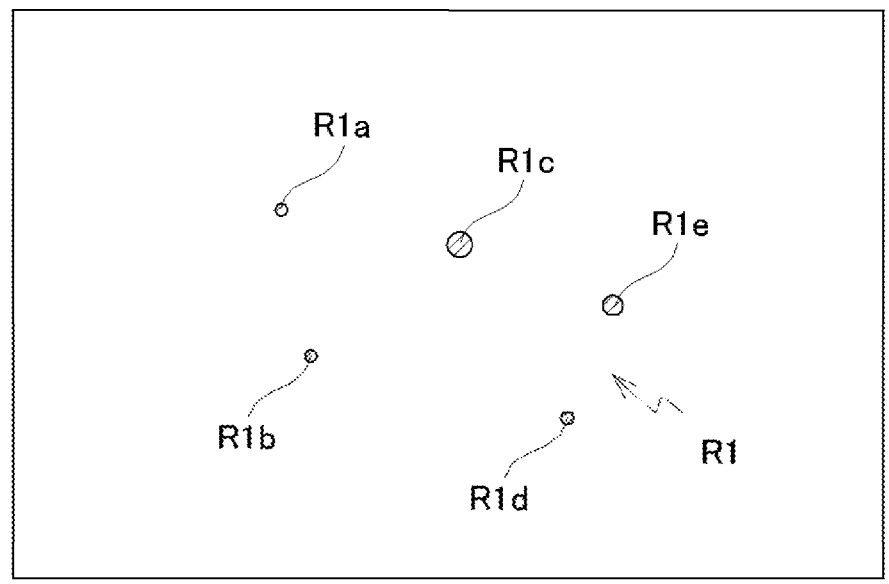
FIG. 7(b) is a view showing the region where a deformed part having a height equal to or greater than the thickness of the n+1$^{th}$ sintered layer is generated, defined by the two-dimensional data.
Figure 8:
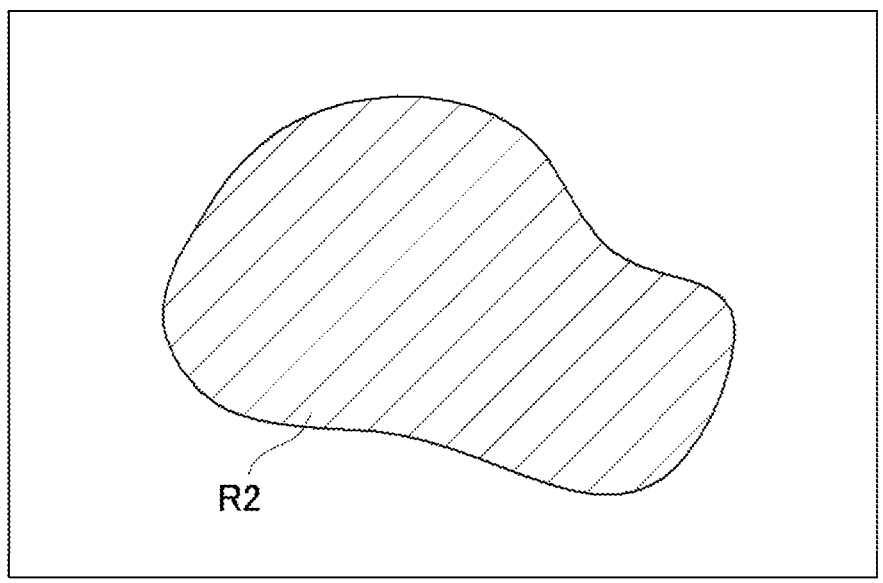
FIG. 8 is a view showing the sintered region of the n+1$^{th}$ sintered layer, defined by the initial n+1$^{th}$ layer shaping data.

If the calculation part 23 of the shape correction calculation device 21 determines that "deformed parts are generated on the $n^{th}$ sintered layer", the calculation part 23 of the shape correction calculation device 21 generates two-dimensional data D2 including the coordinate data of the region where the deformed part having a height equal to or greater than the thickness of the $n+1^{th}$ sintered layer is generated (step S3). More specifically, the two-dimensional data D2 is represented as shown in FIG. 7(b), for example, and the region where the deformed part 26a shown in FIG. 7(a) is generated corresponds to a region R1a, the region where the deformed part 26b is generated corresponds to a region R1b, the region where the deformed part 26c is generated corresponds to a region R1c, the region where the deformed part 26d is generated corresponds to a region R1d, and the region where the deformed part 26e is generated corresponds to a region R1e. The two-dimensional data D2 is transmitted from the shape correction calculation device 21 to the CAM device 15 and stored in the storage part 17.

Figure 9:
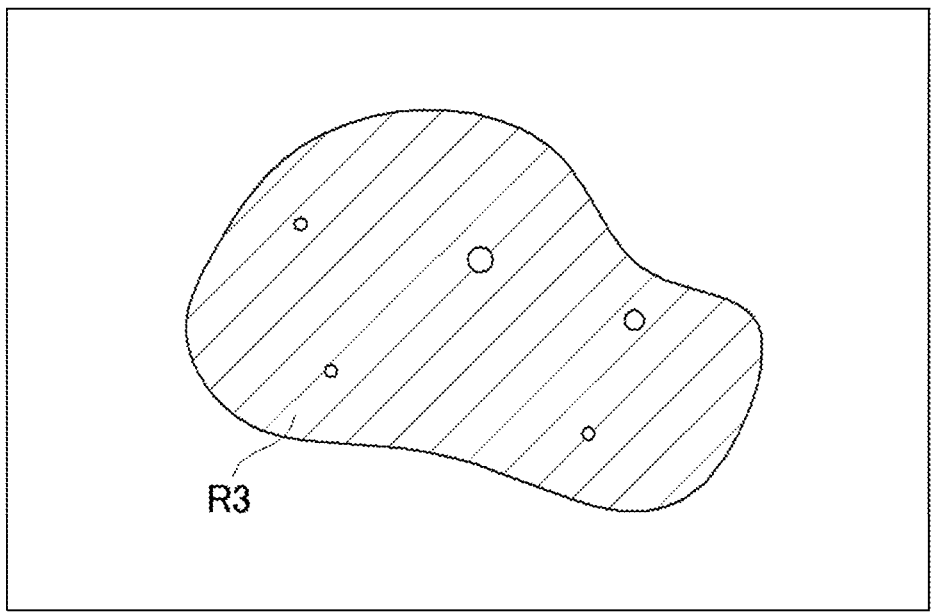
FIG. 9 is a view showing the sintered region of the n+1$^{th}$ sintered layer, defined by the corrected n+1$^{th}$ layer shaping data.

The calculation part 16 of the CAM device 15 matches and compares the coordinates of the two-dimensional data D2 with those of the initial shaping data D3 at the time when the $n+1^{th}$ sintered layer is formed, and generates corrected $n+1^{th}$ layer shaping data D4, which excludes the region where the deformed part is generated from the original $n+1^{th}$ layer laser irradiated region defined by the initial shaping data D3 (step S4). As shown in FIG. 9, for example, the corrected $n+1^{th}$ layer shaping data D4 is represented as a region R3, which excludes the regions R1 where the deformed parts 26a to 26e shown in FIG. 7(b) are generated from the original $n+1^{th}$ layer laser irradiated region R2 shown in FIG. 8. The corrected $n+1^{th}$ layer shaping data D4 is stored in the storage part 17 of the CAM device 15. The corrected $n+1^{th}$ layer shaping data D4 is transmitted from the CAM device 15 to the numerical control device 6 and stored in the storage part 7.

Figure 10A:
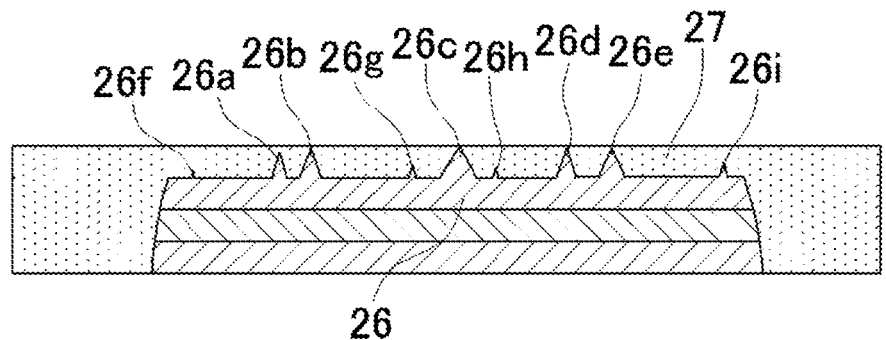
FIG. 10(a) is an internal side view of the three-dimensional object after formation of the n+1$^{th}$ powder layer.
Figure 10B:
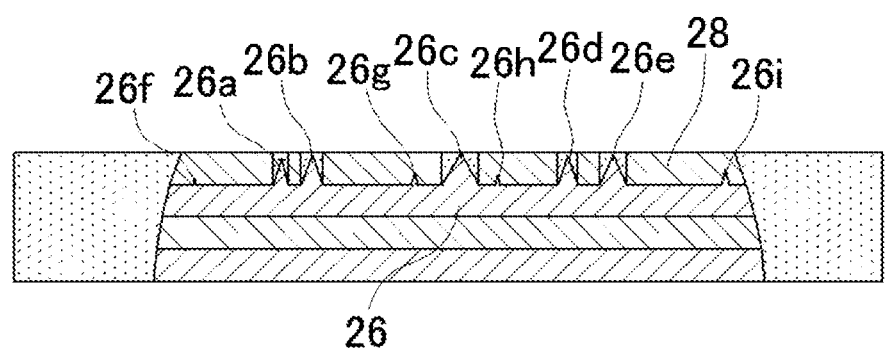
FIG. 10(b) is an internal side view of the three-dimensional object after formation of the n+1$^{th}$ sintered layer.

The decoding part 9 of the calculation part 8 provided in the numerical control device 6 decodes the corrected $n+1^{th}$ layer shaping data D4. The command part 10 outputs commands to the blade servo motor control device 19 and the laser control device 20 via the distribution output part 11 in the order indicated in the corrected $n+1^{th}$ layer shaping data D4, and forms the $n+1^{th}$ powder layer and sintered layer (step S5, step S6). More specifically, the shaping table 2A is lowered by driving the support mechanism drive motor (not shown). In addition, the distance by which the shaping table 2A is lowered is constant for all the layers. In other words, all the powder layers have the same thickness. Next, for example, as shown in FIG. 10(a), the recoater head 3 forms the $n+1^{th}$ powder layer 27 on the $n^{th}$ sintered layer 26 based on the command from the blade servo motor control device 19. Thereafter, for example, as shown in FIG. 10(b), the laser irradiation device 5 irradiates a newly defined irradiated region R3 on the $n+1^{th}$ powder layer 27 with laser based on the command from the laser control device 20, and forms the $n+1^{th}$ sintered layer 28.

If the shape correction calculation device 21 determines that "no deformed part is generated on the $n^{th}$ sintered layer" in the above step S2, the numerical control device 6 outputs a command to each device that controls the additive manufacturing apparatus 1 based on the $n+1^{th}$ layer initial shaping data D3, and forms the $n+1^{th}$ powder layer and sintered layer (step S7, step S8).

Figure 11A:
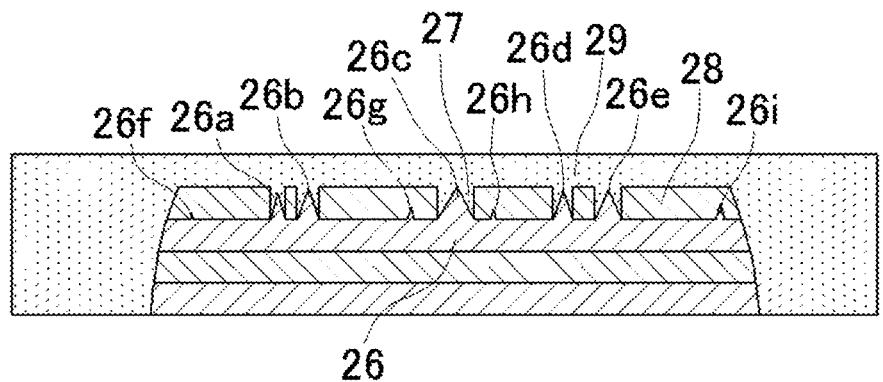
FIG. 11(a) is an internal side view of the three-dimensional object after formation of the n+2$^{th}$ powder layer.
Figure 11B:
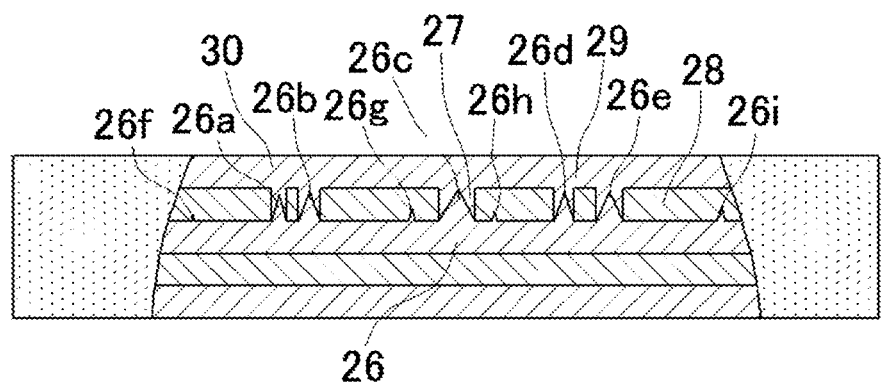
FIG. 11(b) is an internal side view of the three-dimensional object after formation of the n+2$^{th}$ sintered layer.

Next, the decoding part 9 of the calculation part 8 provided in the numerical control device 6 decodes the initial $n+2^{th}$ layer shaping data D5. The command part 10 outputs commands to the blade servo motor control device 19 and the laser control device 20 via the distribution output part 11 in the order indicated in the initial $n+2^{th}$ layer shaping data D5, and forms the $n+2^{th}$ powder layer and sintered layer (step S9, step S10). More specifically, the shaping table 2A is lowered by driving the support mechanism drive motor (not shown). Then, for example, as shown in FIG. 11(a), the recoater head 3 forms the $n+2^{th}$ powder layer 29 on the $n+1^{th}$ sintered layer 28 based on the command from the blade servo motor control device 19. Thereafter, for example, as shown in FIG. 11(b), the laser irradiation device 5 irradiates the $n+1^{th}$ powder layer 27 in the regions R1 that have not been sintered and the $n+2^{th}$ powder layer 29 with laser based on the command from the laser control device 20, and forms the $n+1^{th}$ sintered layer 28 in the regions R1 where the deformed parts 26a to 26e are generated and the $n+2^{th}$ sintered layer 30.

In addition, when irradiating the regions R1 which have not been sintered with laser, the irradiation condition of the laser may be changed with respect to the other regions. More specifically, for example, the moving speed of the laser following the irradiation path may be reduced or the irradiation energy of the laser may be increased, as compared with the other regions.

(Function/Effect)

In the present embodiment, if a deformed part, which has a height equal to or greater than the thickness of the $n+1^{th}$ sintered layer that is to be formed on the $n^{th}$ sintered layer, is generated on the upper surface of the $n^{th}$ sintered layer, the corrected $n+1^{th}$ layer shaping data D4, which excludes the region where the deformed part is generated from the original $n+1^{th}$ layer laser irradiated region, is generated, and the $n+1^{th}$ powder layer is irradiated with laser based on the shaping data D4 to form the $n+1^{th}$ sintered layer, in which the region excluding the region of the deformed part is sintered. Then, the region where the deformed part is generated is sintered after the $n+1^{th}$ powder layer and the $n+2^{th}$ powder layer are formed on the deformed part. Thus, it is possible to prevent the above-described deformation from being continuously generated at a specific location, and to reset the three-dimensional object that is being shaped to the state before the deformed part is generated. Therefore, it is possible to prevent the blade from being caught during formation of the powder layer.

Exemplary embodiments of the disclosure have been described above, but the disclosure is not limited to the embodiments and examples described above, and it is possible to make various design changes within the scope of the claims.

In the present embodiment, the powder layers have the same thickness. However, the thickness of each powder layer may be changed according to the height of the deformed part generated on the underlying sintered layer. In other words, the distance by which the shaping table 2A is lowered may be changed according to the height of the deformed part generated on the underlying sintered layer. More specifically, the distance by which the shaping table 2A is lowered may be changed as appropriate for each layer according to the analysis result of the three-dimensional shaping data D1, so that the thickness of the powder layer is greater than the height of the highest one of the deformed parts generated on the underlying sintered layer. Thereby, it is possible to prevent the deformed part from popping out of the upper surface of the powder layer, and to reliably prevent collision between the deformed part and the blade 3A.

Further, the blade 3A may be configured by a brush-like brush blade. Thus, even if an abnormal sintered part or deformed part that has a height greater than the thickness of the $n+1^{th}$ powder layer is generated on the $n^{th}$ sintered layer, the powder layer can be formed without damaging the blade.

In addition, it is described above that the camera 18a and the projector 18b acquire the three-dimensional shaping data D1 of the upper surface of the $n^{th}$ sintered layer by using a grid projection method. However, any three-dimensional measuring device and acquisition method may be used if they can acquire the three-dimensional shaping data D1 of the upper surface of the $n^{th}$ sintered layer. For example, instead of using the projector 18b, a weak laser having an output within a range that does not sinter the material powder may be projected from the laser irradiation device 5 to scan the upper surface of the $n^{th}$ sintered layer so as to acquire the three-dimensional shaping data D1 of the upper surface of the $n^{th}$ sintered layer.

Moreover, it is described above that, when detecting the deformed parts 26a to 26e which have heights equal to or greater than the thickness hl of the $n+1^{th}$ sintered layer 28 that is to be formed on the $n^{th}$ sintered layer 26, it is determined that "deformed parts are generated on the $n^{th}$ sintered layer". However, the height of the deformed part for determining that "deformed parts are generated on the $n^{th}$ sintered layer" may be set to any value. For example, the height of the deformed part for determining that "deformed parts are generated on the $n^{th}$ sintered layer" may be set to a value that is sufficiently smaller than the thickness of each layer, or to a value greater than zero, and the $n+1^{th}$ powder layer may be laser-sintered by avoiding all the regions having the deformed parts.

Further, the shape correction calculation device 21 may be provided, for example, in any of the devices, such as the three-dimensional measuring device 18, that constitutes part of the additive manufacturing apparatus 1.

In addition, the above-mentioned series of steps may be performed for each layer or every time a plurality of sintered layers are formed.

What is claimed is:

1. A method of additive manufacturing a three-dimensional object for irradiating with laser a predetermined region of each powder layer, which is composed of material powder of metal formed on a shaping table and having a same thickness, based on shaping data of the three-dimensional object, which is a production target, to laminate and form a sintered layer, the method of additive manufacturing the three-dimensional object comprising:
   a three-dimensional shaping data acquisition process of acquiring three-dimensional shaping data of an upper surface of an $n^{th}$ sintered layer positioned uppermost;
   a deformed part detection process of detecting whether a deformed part having a height equal to or greater than a thickness of an $n+1^{th}$ sintered layer, which protrudes with respect to the upper surface of the $n^{th}$ sintered layer, is generated based on the three-dimensional shaping data;
   a two-dimensional data generation process of generating two-dimensional data comprising coordinate data of a region where the deformed part is generated when the deformed part is generated;
   a corrected $n+1^{th}$ layer shaping data generation process of matching and comparing coordinates of initial $n+1^{th}$ layer shaping data and the two-dimensional data, and generating corrected $n+1^{th}$ layer shaping data that excludes the region where the deformed part is generated, which is defined in the two-dimensional data, from a laser irradiated region defined in the initial $n+1^{th}$ layer shaping data;
   an $n+1^{th}$ powder layer formation process of forming an $n+1^{th}$ powder layer on the $n^{th}$ sintered layer by lowering the shaping table by the thickness of the powder layer, supplying the material powder with a recoater head, and flattening the material powder with a blade;
   a formation process for the $n+1^{th}$ sintered layer excluding the region where the deformed part is generated, in which the $n+1^{th}$ sintered layer is formed by irradiating with laser and sintering the $n+1^{th}$ powder layer based on the corrected $n+1^{th}$ layer shaping data;
   an $n+2^{th}$ powder layer formation process of forming an $n+2^{th}$ powder layer on the $n+1^{th}$ sintered layer by lowering the shaping table by the thickness of the powder layer, supplying the material powder with the recoater head, and flattening the material powder with the blade; and
   a formation process for the $n+1^{th}$ sintered layer in the region where the deformed part is generated and an $n+2^{th}$ sintered layer, in which the $n+1^{th}$ sintered layer in the region where the deformed part is generated and the $n+2^{th}$ sintered layer are formed by irradiating with laser and sintering the region where the deformed part is generated in the $n+1^{th}$ powder layer and the $n+2^{th}$ powder layer based on $n+2^{th}$ shaping data.

2. The method of additive manufacturing the three-dimensional object according to claim 1, wherein the blade is a brush blade.

* * * * *